Figure 1:
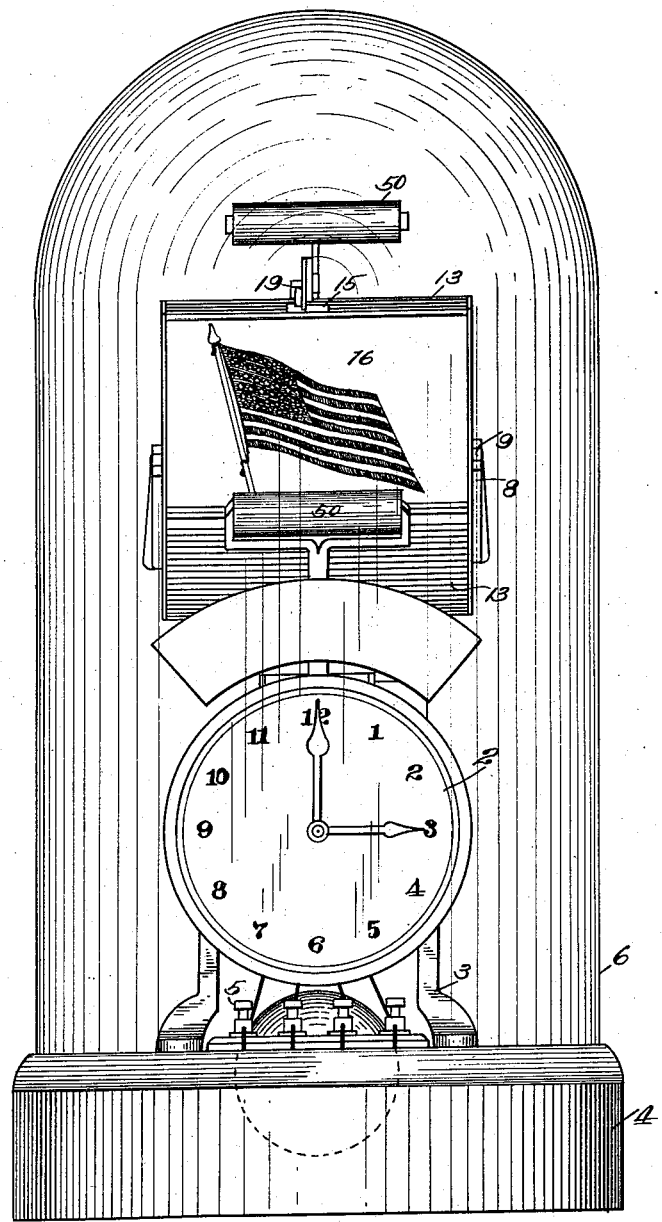

C. H. KING.
ADVERTISING APPARATUS.
APPLICATION FILED OCT. 1, 1914.

1,165,182.

Patented Dec. 21, 1915.
5 SHEETS—SHEET 1.

WITNESSES:
F. E. Maynard.
Irene Sinnett.

INVENTOR
Charles H. King,
BY G. H. Strong.
ATTORNEY

C. H. KING.
ADVERTISING APPARATUS.
APPLICATION FILED OCT. 14, 1914.

1,165,182.

Patented Dec. 21, 1915.
5 SHEETS—SHEET 2.

WITNESSES:
F. E. Maynard.
Irome Sinnett.

INVENTOR
Charles H. King,
BY G. H. Strong.
ATTORNEY

UNITED STATES PATENT OFFICE.

CHARLES H. KING, OF OAKLAND, CALIFORNIA, ASSIGNOR TO NATIONAL TIME SERVICE & ADVERTISING CO., OF OAKLAND, CALIFORNIA, A CORPORATION OF CALIFORNIA.

ADVERTISING APPARATUS.

1,165,182.  Specification of Letters Patent.  Patented Dec. 21, 1915.

Application filed October 14, 1914. Serial No. 866,599.

*To all whom it may concern:*

Be it known that I, CHARLES H. KING, a citizen of the United States, residing at Oakland, in the county of Alameda and State of California, have invented new and useful Improvements in Advertising Apparatus, of which the following is a specification.

This invention relates to advertising machines of the type disclosed in my prior Patents #1,002,588 and #1,035,662, dated respectively September 5, 1911 and August 13, 1912.

One of the objects of the present invention is to provide in an advertising apparatus a display medium, preferably of flexible material, which is so mounted that it may be displayed in taut condition at a suitable angle as to be readily observable; and particularly to so mount such a display medium that it will automatically fold into concealed position without the use of any extraneous folding mechanism or devices.

A further object of the invention is to provide an advertising mechanism comprising a relatively large number of display mediums designed, constructed, proportioned and arranged for the economical use of space, and particularly in which the display mediums are durable, simple and cheap in construction; and to provide a means for intermittently displaying for a predetermined period of time the successive display mediums, said means being purposely designed for the ready installation and arrangement of the advertising mediums.

It is an important purpose of my present invention to provide an apparatus which consists of a plurality of independent advertising mediums, with means whereby said mediums may be successively and intermittently displayed, and which means is actuated by power utilized only at the period of change of the mediums from one to the other, thus saving in consumption of power and providing a machine which may be run so as to display its advertising mediums for a given period of time with the least possible expense.

Another object of the present invention is to provide a particularly attractive machine, having in combination with a suitable clock, a bank of display mediums arranged for control by the clock, and in which the several elements of the apparatus may be inclosed in a transparent cover for the protection of the mechanism and clear exposure thereof; this exposure tending to render the apparatus more attractive because of the ingenuity of the construction and of the apparently complicated mechanism, which, as it is well known, is in itself an attractive force to the curious and the mechanically inclined public.

The invention consists of the parts and the construction and combination of parts as hereinafter more fully described and claimed, having reference to the accompanying drawings, in which—

Figure 2:
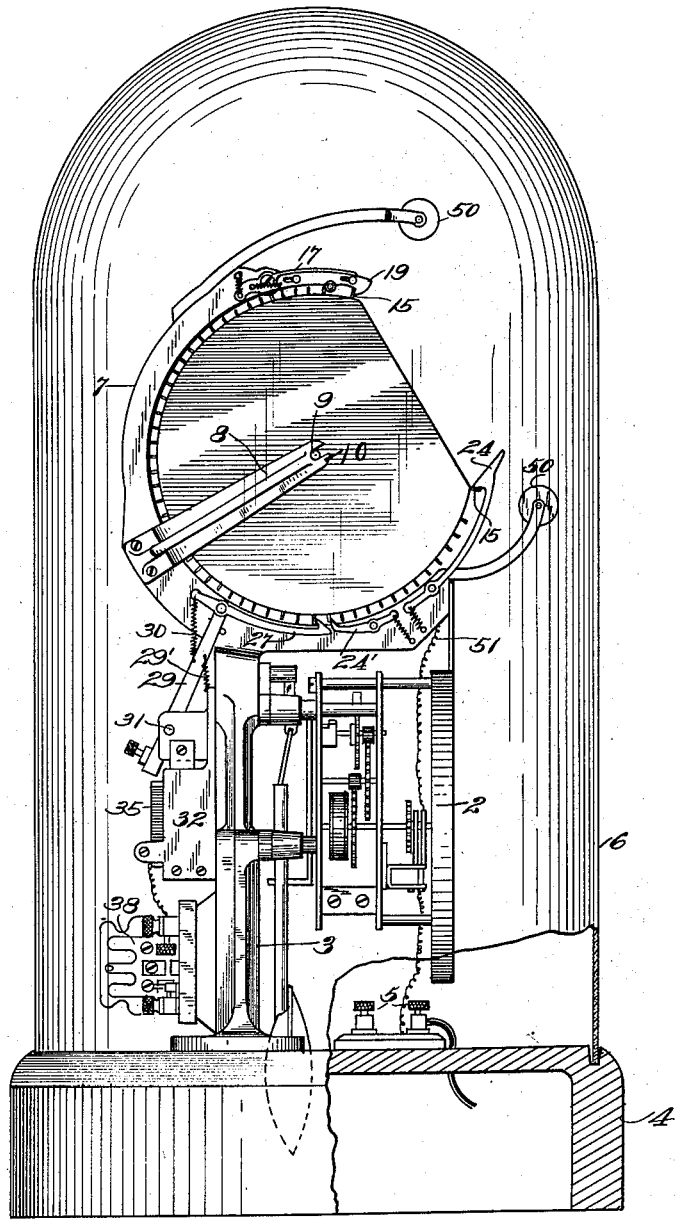
Figure 3:
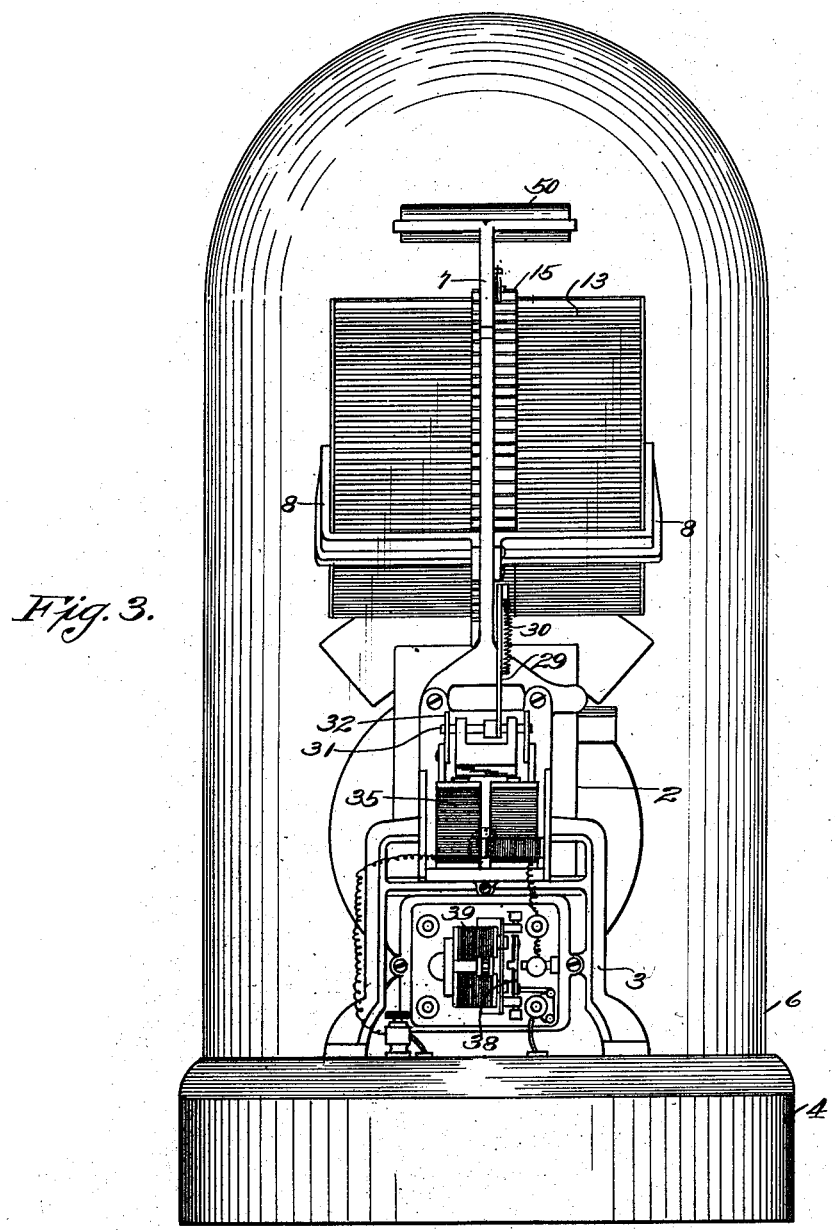
Figure 4:
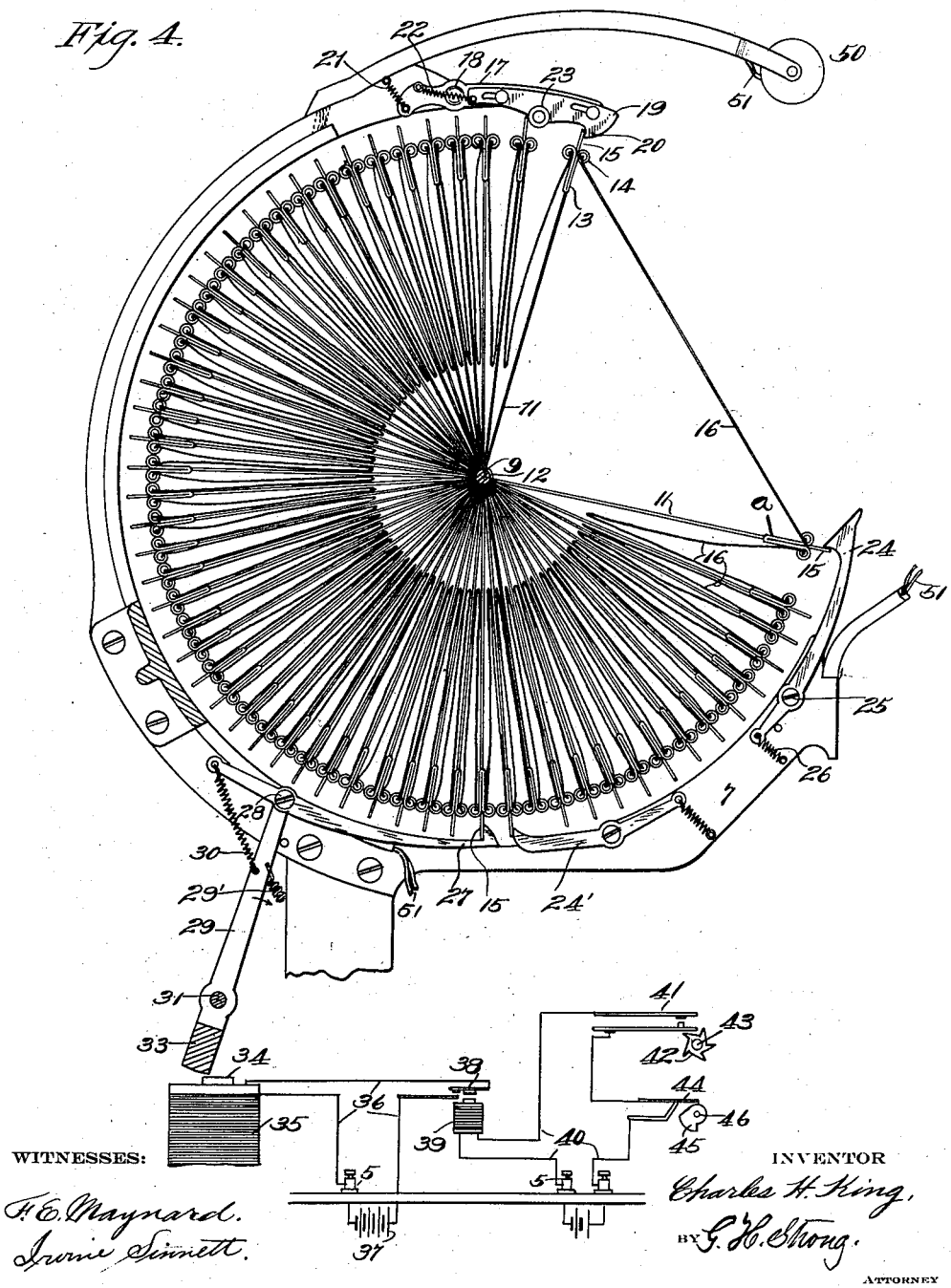
Figure 5:
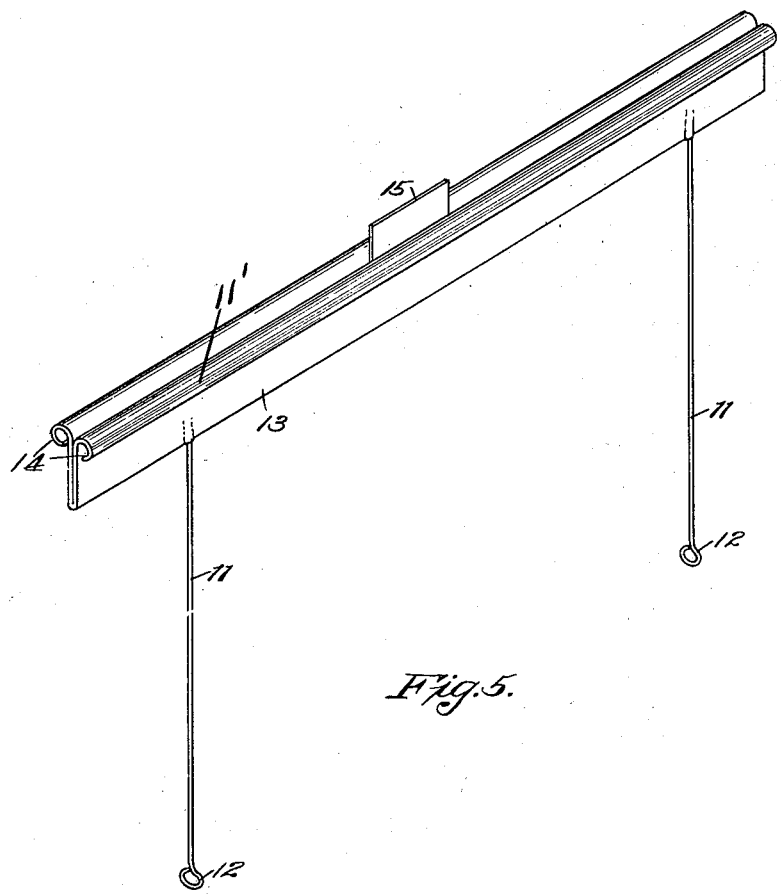

Figure 1 is a front elevation of the advertising machine. Fig. 2 is a side elevation of the left side of the apparatus. Fig. 3 is a rear view of the apparatus. Fig. 4 is a detail side elevation of the display mediums and their controlling and actuating means, with the electrical circuit shown diagrammatically. Fig. 5 is a perspective view of one of the radial wings or frames.

Referring to the drawings, 2 indicates a suitable clock, which may be of any desired type, as, for instance, an electrically wound clock, the frame of which is securely mounted upon a vertical standard 3, secured at its base to a pedestal 4. The pedestal 4 is shown here as of hollow construction for the ready connection of the several electrical circuits which may be utilized and the terminals of which are shown in Fig. 1 at 5; the circuits being thence led into the clock in respective order. The mechanism mounted upon the pedestal 4 is preferably inclosed in a transparent dome 6 which protects the works and at the same time renders them clearly visible from the exterior so as to be attractive to observers.

7 is an arm mounted upon the top of the standard 3 and having slotted brackets 8 in which an axle 9 is readily slidable. Upon the axle 9 there is freely and independently turnable a large number of radial frames, comprising the radius wires or arms 11 which are clearly shown in Fig. 5, these being arranged in pairs having eyes 12 at their inner ends to fit upon the axle 9. The outer ends of the respective pairs of radial wires 11 are connected by a transverse bar 13, formed U-shaped in cross section for simplicity and cheapness of construction, with opposite longitudinal beads 14 on each side at the top of the bar. The radius wires 11 are suitably secured in the bar 13 and the latter is provided at its central portion with a short, outwardly projecting horn 15. Contiguous radial wings or frames are interconnected in pairs by a flexible web or medium 16 which is preferably of a strong, durable and easily foldable material, such as cloth, and upon either or both sides of which may be formed or placed the advertising matter, or a picture, or any other desired subject. The parallel edges of the advertising sheet 16, adapted to connect adjacent frame members 13, are suitably secured in the adjacent beads 14 of the parallel and coordinate bars 13 of a pair of frame members. Thus each of the bars 13 has connected to its oppsite beads 14 an advertising medium or sheet 16, the opposite parallel edges of which are connected to the adjacent wing frames.

A suitable stack or number of the radial wing frames 11 is mounted for free turning movement upon the central axle 9 and all of the transverse bars 13 of the frames are interconnected with the next adjacent bar by a flexible advertising sheet or medium 16, as stated. The axle 9, with the removable advertising mediums thereon, is adjusted in the slotted ends 10 of the brackets 8 on the central, segmental bearing frame 7 and the advertising mediums 16 are then ready for successive display by being distended in taut condition by any suitable mechanism so as to appear for clear observation.

Preferably the number of advertising mediums, including the sheets 16 with their respective frames 11', is sufficient to permit one of the mediums 16 being stretched at an oblique angle at one side of the stack of the frames with relation to the axle 9 and it is particularly desirable that the angle of obliquity of the exposed sheet 16 be such that it will automatically fold without the requirement of any folding device *per se*. This desideratum I obtain by providing upon the top of the frame segment 7 a suitable device, comprising a pawl with a section 17 pivoted at 18 on the frame and having slidably mounted on its outer portion a yieldable escape detent 19; the downwardly turned portion 20 of which is adapted to engage successively the horns 15 of the radial frame 11'. The composite pawl 17—19 is tilted downwardly through means of a suitable spring 21, one end of which is connected to the adjacent portion of the segmental arm 7, and the detent member 19 is normally retracted on the carrying part 17 of the pawl by a spring 22. The slidable detent 19 is also provided with a roller 23 on its lower edge which is adapted to encounter and hold the next radial wing 11' which follows the foremost wing retained by the point 20 of the sliding detent 19.

By positioning the pawl 17 adjacent to the top of the arcuate stack of folded advertising sheets 16, when the foremost upper frame 11' is engaged by the point 20 of the detent 19 the sheet 16 connected to its forward side extends obliquely approximately in the chord of an arc. The wing frame 11' at its lower and opposite edge in the position *a*, Fig. 4, is retained by a latch 24 pivoted at 25 upon the front lower end of the segmental frame 7 and the latch is automatically operated by a spring 26. The angle of obliquity of the disclosed and taut sheet 16, held between the coöperative pawls 17 and 24, is preferably such that when the top lever 17 releases the upper, foremost wing 11', the sheet 16 will automatically fold, under the force of gravity, inwardly between the downwardly swinging released frame 11', thereby eliminating the requirement of any positive means for folding the sheet from a taut and displaying position.

It is one of the important features of the present invention to provide a means for intermittently turning the stack of radial wing frames 11', with their respective display sheets 16, so as to successively and intermittently display these sheets. In the present invention this means comprises a magnetically operated and electrically controlled mechanism which consists of an impeller in the form of a hook lever 27, suitably positioned with relation to the segmental stack of radial frames and here shown as so located as to engage the horns 15 of the frames 11' as they pass through the lower portion of their orbit about the axis 4. The lever 27 is pivoted at 28 upon the upper end of a lever 29 and is normally thrown yieldably upwardly to engage the successive horns 15 by a spring 30. The actuating lever 29 of the impeller 27 is secured to a rocker shaft 31 which is pivoted, as shown in Fig. 3, in a suitable bearing plate 32 which is secured to the side of the standard 3 opposite to the clock 2. The lever 29 is rigidly secured to or formed with an armature 33 adapted to sweep through a magnetic field produced at the pole pieces 34 of an electromagnet 35 which is suitably mounted upon the bearing plate 32.

The energization of the powerful electromagnet 35 is controlled primarily through a suitable mechanism which is designed to operate automatically at suitable periods at which it may be predetermined to have the impeller 27 engage and turn the stack of frames 11', with their display sheets 16, so that these will be displayed successively for suitable periods at desired intervals. To that end the magnet 35 is here shown as provided with a circuit 36 with a battery 37 and an electromagnetic switch 38 adapted to be closed by a relay magnet 39, the circuit wires 40 of which are electrified from a suitable source of current and in which is introduced a circuit breaker 41.

It is one of the features and elements of my invention to provide the magnet circuit 36 with a sufficiently high voltage to produce a strong magnetic force at the pole pieces 34 for the positive and reliable operation of the lever 29 and the impeller 27 and at the same time to provide a relay circuit 40, carrying a weaker current, which is sufficient, by means of the relay magnet 39, to close the circuit breaker 38 of the power magnet 35.

Another important feature of this invention is to provide, in combination with the relay circuit 40, a circuit breaker 41 and a device controlled by the works of the clock 2 for closing the circuit breaker so that at suitable intervals the device actuated by the clockwork will close the circuit breaker 41 for the energization of the relay magnet 39; this in turn closing the circuit breaker 38 of the prime or actuating magnet 35 and causing the movement of the segmental stack of frames and the release automatically of a previously displayed sheet 16 and the disclosure of the next successive sheet.

In order that a change of advertising mediums may be had at desired intervals, I provide for closing the circuit breaker 41 a cam or star-wheel 42 which is secured upon the second wheel shaft 43 of the clockwork of the clock 2. Thus if the star-wheel 42 has five points, then in each sixty seconds the circuit breaker 41 will be closed through the action of the star-wheel 42 every twelve seconds. Upon the closure of this circuit the power magnet 35 will be energized synchronously with the energization of the relay magnet 39 and a change of views or exposures be obtained in the advertising device.

In order to economize in the consumption of current during such hours out of the twenty-four of a day when the operation of the apparatus would be uneconomical, such, for instance, as between the hours of twelve o'clock midnight and four o'clock in the morning, it is desired that the relay circuit 40 be interrupted for this period of time and between these hours. For that purpose another circuit breaker 44 is introduced in the circuit 40 of the relay magnet; the breaking of the circuit at the breaker 34 being produced by a cam 45 mounted upon a shaft 46 geared in the clockwork of the clock 2 to make one revolution in every twenty-four hours. The high point of the cam 45 is effective at the approach of the hour at which it is desired to cut out the circuit 40 to open the circuit breaker 44 and hold it in electrical disconnection the requisite period or, say, until four o'clock in the morning.

The effectual illumination of the clock and the advertising sheets is provided for by concealed or shaded electric lights 50 which are conveniently mounted upon the frame of the device and are energized through the feed wires 51 leading from a suitable source of electrical energy.

The impeller 27 is automatically thrown forward by a return or pull spring 29' and the stack of wings is locked against reverse movement by a lock dog 24'.

Having thus described my invention, what I claim and desire to secure by Letters Patent is—

1. In an advertising apparatus, a display medium comprising a flexible sheet with radial frames connected at opposite edges thereof and adapted for swinging movement about a common axis, with means for maintaining the coördinate frames in such angular position that the sheet will automatically flex downwardly by gravity between the frames when one moves toward the other.

2. In an advertising apparatus, a flexible display medium, and means for holding such medium distended in display position at an angle to the vertical such that said medium will of its own weight fold without the assistance of extraneous devices when released.

3. In an advertising apparatus, the combination with an axial support, of a plurality of radial, relatively movable frames each turnable entirely about said support and adapted to lie longitudinally together in the form of a segmental annulus about the support, flexible webs connected at their parallel edges to the facing sides of contiguous pairs of said wings, and means holding separated the pairs of frames to distend each web at such an angle that the web will fold of its own weight toward said support and between the frames as the upper frame falls.

4. In an advertising apparatus, the combination of a plurality of relatively movable radial frames each connected to the other by a flexible display medium adapted to be distended in approximately the chord of an arc, angularly disposed to both the horizontal and vertical planes, an axial support upon which said frames are mounted and about which they move in a circle, and a bearing structure for said support.

5. In an advertising apparatus, the combination of a plurality of relatively movable radial frames each connected to the other by a flexible display medium adapted to be distended in approximately the chord of an arc, an axial support upon which said frames are mounted and about which they move in a circle, a bearing structure for said support, said structure including an arcuate frame, and means mounted upon said frame for holding a connected pair of said frames separated at substantially right angles for the display of said mediums.

6. The combination in an advertising apparatus, of a series of flexible display mediums, radial wing frames mounted upon and turnable about a common axis and which are connected in pairs by said flexible mediums, means comprising an intermittently energized actuator for successively turning said frames into such a position that their connecting display mediums are distended in displaying position with said frames at substantially right angles to each other, said actuator including a reciprocating hook engageable with each of said frames, and an electromagnet for moving the actuator.

7. A radial wing structure for advertising apparatus, said wing structure comprising a transverse V-shaped connecting bar folded upon itself and having opposite longitudinal beads for the attachment of a display medium, and a pair of parallel wires clamped directly between the sides of said V-shaped member.

8. In an advertising apparatus, the combination with a supporting structure consisting of bearing members with axial common seats, of an axle removably mounted upon said seats, a plurality of radial, relatively movable wing frames freely mounted upon said axle, said frames being adapted to rest longitudinally upon each other, means upon said support for holding a pair of adjacent wing frames separated at substantially right angles one from the other, and foldable display mediums connected at parallel edges to adjacent faces of said frames.

9. The combination in an advertising apparatus of a plurality of flexible display mediums in a common circle about a common axis and adapted to be distended in the plane of a chord of said circle subtending an angle of substantially ninety degrees, means for holding said mediums in their displaying position, and means for moving said mediums to cause their successive display.

In testimony whereof I have hereunto set my hand in the presence of two subscribing witnesses.

CHARLES H. KING.

Witnesses:
JOHN H. HERRING,
W. W. HEALEY.